United States Patent [19]
Shimada et al.

[11] Patent Number: 5,978,544
[45] Date of Patent: Nov. 2, 1999

[54] VIDEO COMPRESSION CODING APPARATUS AND VIDEO COMPRESSION RECORDING/PLAYBACK APPARATUS

[75] Inventors: Hideyuki Shimada, Tokyo; Kouei Kawamura, Yokohama; Noriaki Tanabiki, Kawasaki; Yuuzi Sano, Yokohama, all of Japan

[73] Assignee: Kabushiki Kaisha Toshiba, Kawasaki, Japan

[21] Appl. No.: 08/744,556

[22] Filed: Nov. 6, 1996

Related U.S. Application Data

[63] Continuation of application No. 08/266,632, Jun. 28, 1994, abandoned.

[30] Foreign Application Priority Data

Jun. 28, 1993 [JP] Japan ................................... 5-156456
Nov. 15, 1993 [JP] Japan ................................... 5-285164

[51] Int. Cl.[6] ............................. H04N 5/92; H04N 7/12; H04N 11/02; H04N 11/04
[52] U.S. Cl. .......................... 386/112; 348/405; 348/419
[58] Field of Search ................................... 348/405, 419; 382/251; 341/200; 386/33, 109, 111–112; 358/906, 909.1; H04N 5/76, 5/92, 9/79, 7/12, 11/02, 11/04, 5/225

[56] References Cited

U.S. PATENT DOCUMENTS

| | | | |
|---|---|---|---|
| 4,093,962 | 6/1978 | Ishiguro et al. | 348/419 |
| 5,032,927 | 7/1991 | Watanabe et al. | 358/335 |
| 5,040,061 | 8/1991 | Yonemitsu | 386/111 |
| 5,239,382 | 8/1993 | Hatakenaka et al. | 358/335 |
| 5,274,457 | 12/1993 | Kobayashi et al. | 358/906 |
| 5,333,012 | 7/1994 | Shinghal et al. | 348/405 |
| 5,351,083 | 9/1994 | Tsukagoshi | 348/405 |
| 5,374,958 | 12/1994 | Yanagihara | 348/405 |
| 5,410,351 | 4/1995 | Kojima | 348/405 |
| 5,576,758 | 11/1996 | Arai et al. | 348/220 |

FOREIGN PATENT DOCUMENTS

4-234282  8/1992  Japan .
5-49021  2/1993  Japan .

Primary Examiner—Thai Tran
Attorney, Agent, or Firm—Oblon, Spivak, McClelland, Maier & Neustadt, P.C.

[57] ABSTRACT

The object of the present invention is to provide a video compression coding apparatus which, in the case where a code quantity variation allows a greater margin, can compress video data while suppressing any degradation of a video quality. First, input video data, after being transformed by a DCT section to a DCT coefficient, is quantized, by a quantizing section, with a quantization level designated with quantization control data. This quantized data is input to a variable length coding section where it is compression-coded in a block unit corresponding to a field or frame. A code quantity detecting section detects a code quantity of this coded data and delivers a result of detection to a quantization control section. The quantization control section has a given coding quantity-quantization level control characteristic representing a relation, to the quantization level, of the code quantity which obtains an average code quantity of initially input video data. The quantization control section determines a quantization level of the next block on the basis of the control characteristic and code quantity information from the code quantity detecting section and generates corresponding quantization control data.

9 Claims, 8 Drawing Sheets

VIDEO COMPRESSION CODING APPARATUS AND VIDEO COMPRESSION RECORDING/PLAYBACK APPARATUS

This application is a Continuation of application Ser. No. 08/266,632, filed on Jun. 28, 1994, now abandoned.

BACKGROUND OF THE INVENTION

1. Field of the Invention

The present invention relates to a video compression coding apparatus utilized for video data transmission and recording and to a video compression recording/playback apparatus for recording and play back video data on a highly efficiently compressed form.

2. Description of the Related Art

Conventionally, upon transmission, video data is often transmitted on a compression-coded form in view of the limited capacity of data transmission on a transmission circuit line and a cost involved. Even on the video recording apparatus, video data is sometimes recorded on a compression coded form in view of the cost, etc., of a recording medium.

In such a conventional video compression coding apparatus for performing compression coding process on the video data, control is effected to make a code quantity per unit time constant so as to correspond to the capacity of the transmission circuit line or of a recording medium.

In a practical application, if more code quantity is involved for a target code quantity, the video quality, that is, a quantization level is lowered to decrease the code quantity, while, on the other hand, if less code quantity is involved in that situation, the video quality, that is, the quantization level is enhanced to increase the code quantity.

At that time, the code quantity varies in accordance with the control of the quantization level. The code quantity levels, on the average, are fitted to the target code quantity and it is possible to accommodate a variation of the code quantity with the use of a buffer memory which is provided at an output stage. By so doing, the code quantity, after being compressed, is prevented by the type of image from being varied so that the code quantity is maintained constant.

In the video compression coding apparatus for making the code quantity constant as set out above, the video quality varies greatly by the type of image.

In the conventional video compression recording/playback apparatus, on the other hand, much difficulty is encounted in varying the per-unit-time reading rate of a magnetic medium, such as a recording medium and, for this reason, video compression is carried out with the use of a recording data quantity of at least a given field or frame unit. In a such video compression system, however, the compression rate is too high with respect to a quantity of information in the type of image containing more high-pass components, thus sometimes producing an image degradation upon playback.

SUMMARY OF THE INVENTION

As set out above, the conventional video compression coding apparatus has adopted a code quantity uniformalizing system, thus offering the disadvantage of suffering a greatly varying video image resulting from the type of image.

Of the conventional video recording/playback apparatuses, a video compression system for recording a data quantity in a given field or frame unit is such that an image quality is sometimes adversely affected due to too high a data rate involved with respect to an information quantity. In a video compression system equipped with a buffer at an input/output section of a recording/playback apparatus to make recording with a data quantity variable, the drawback has been encountered that it is not possible to instantly play back a recording material from any given field or frame.

One object of the present invention is to provide a video compression coding apparatus which, in the case where a code quantity variation allows a greater margin, can compress video data with high efficiency while suppressing the degradation of a video quality.

Another object of the present invention is to provide a video compression recording/playback apparatus which can instantly make a playback operation from any given field or frame without adversely affecting an image quality of a video material or element.

According to one aspect of the present invention, there is provided a video compression coding apparatus comprising:

a quantizing section for quantizing unit video data, which is divided in units of a predetermined time interval, with a quantization level designated with quantization control data;

a variable length coding section for compression coding quantized data, which is output from the quantizing section, in predetermined block units;

a code quantity detecting section for detecting a code quantity of the coded data output from the variable length coding section; and a quantization control section having a given code quantity-quantization level control characteristic representing a relation, to the quantization level, of a code quantity which initially obtains an average code quantity of the unit video data, the quantization control section determining a quantization level of the next block on the basis of both the control characteristic and code quantity information from the code quantity detecting section, generating corresponding quantization control data and supplying this data to the quantizing section whereby the quantization level is controlled to become an appropriate level.

According to another aspect of the present invention, there is provided a video compression coding apparatus comprising:

a quantizing section for quantizing unit video data, which is divided in units of a predetermined time interval, with a quantization level designated with quantization control data;

a variable length coding section for compression coding quantized data, which is output from the quantizing section, in predetermined block units;

a code generation quantity estimating section for estimating, from the video data, a code generation quantity of the quantized data output from the variable length coding section; and a quantization control section for generating quantization control data on the basis of a result of estimation by the code generation quantity estimating section and sending this data to the quantizing section whereby the quantization level is controlled to become an appropriate level.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 10A to 10D show a timing diagram for explaining the operation of the present embodiment: FIG. 10A, FIG. 10B, FIG. 10C and FIG. 10D, each, showing a portion of the timing diagram above;

DETAILED DESCRIPTION OF THE PREFERRED EMBODIMENTS

The embodiment of the present invention will be explained below with reference to the accompanying drawings.

Figure 1:
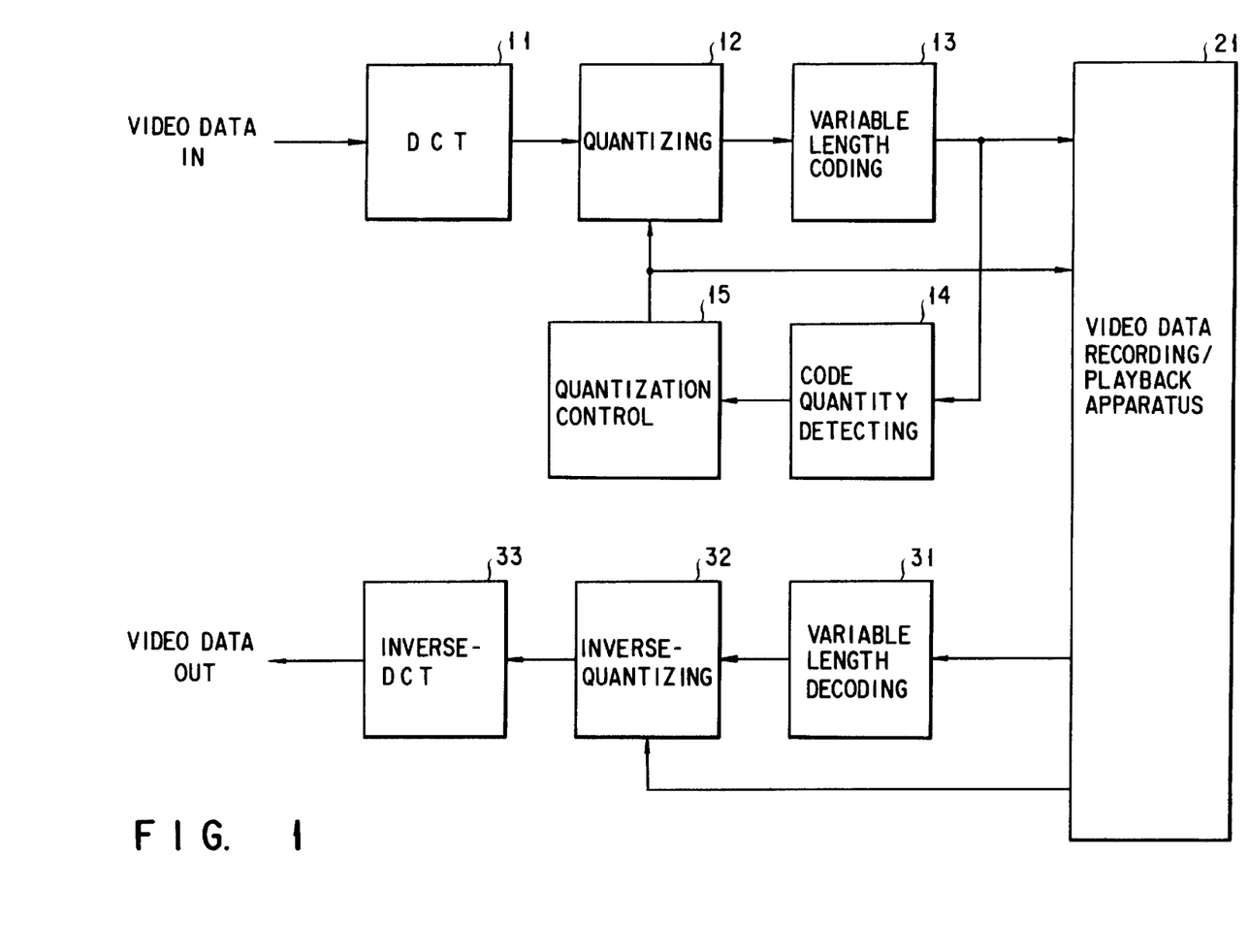
FIG. 1 is a block circuit diagram showing an arrangement of a video compression recording/playback apparatus using a video compression coding apparatus according to one embodiment of the present invention.

FIG. 1 shows an arrangement of a video compression recording/playback apparatus using a video compression coding apparatus which is provided as a first embodiment of the present invention.

In FIG. 1, input video data, being transformed to a DCT coefficient by a DCT section (discrete cosine transform: 2-dimensional discrete cosine conversion section) 11, is quantized by a quantizing section 12 on the basis of quantized control data and coded by a variable length coding section 13 for each frame and the coded data is sent to a video data recording/playback apparatus 21.

A coding quantity detecting section 14 receives coded data, which is output from the variable length coding section 13, and detects its code quantity. This coded quantity information is sent to a quantization control section 15. The quantization control section 15 determines an appropriate quantization level from the input code quantity information and feeds quantized control data, as an output corresponding to a result of determination, to the quantizing section 12.

The video data recording/playback apparatus 21 has, for example, a semiconductor memory as a recording medium and has a recording mode and playback mode. The apparatus 21 receives, in a recording mode, the coded data from the variable length coding section 13 and quantized control data from the quantization control section 15 and allows the data to be sequentially written into the semiconductor memory and, in a playback mode, allows any coded data to be read from the semiconductor memory and corresponding quantized control data to be read out.

The video data recording/playback apparatus 21 plays back the coded data and sends it to a variable length decoding section 31 and the quantized control data of the apparatus 21 is sent to an inverse-quantizing section 32. The coded data input to the variable length decoding section 31 is converted back to an original quantized data which, in turn, inverse-quantized based on the quantized control data. The output of the inverse-quantizing section is inverse-DCT transformed by an inverse DCT section 33 whereby original video data is demodulated.

In conjunction with the aforementioned arrangement, the algorithm of the quantization control section 15 which is the feature of the present invention will be explained below by referring to FIGS. 2 to 4.

Now let it be assumed that, as the recording conditions of the video recording/playback section 15, a code quantity D for each frame is allowed from a minimum $d_L=0$ kilobyte to a maximum du=300 kilobytes and a quantization level Q secured as the quality of the video is a minimum $q_L=90\%$ (given that the quantization level Q of the input video data is represented by 1 to 100%).

First, an average code quantity $d_V$ is found by accumulating a code quantity D, for each frame, over a long period of time and dividing it by the number of frames accumulated. Further, a D–Q (code quantity-quantization level) control characteristic is found with which the quantization level is controlled so as to enable the output data of the variable length coding section 13 to become the average code quantity $d_{aV}$. Since the characteristic depends upon the type of image, it is not necessary to code the video of various types of images and make checking for their tendency. One example is shown in FIG. 3. It is to be noted that, in order that a compression effect, even if being slight in FIG. 3, may be obtained, the quantization level Q becomes a maximum $q_H=96\%$.

Figure 2:
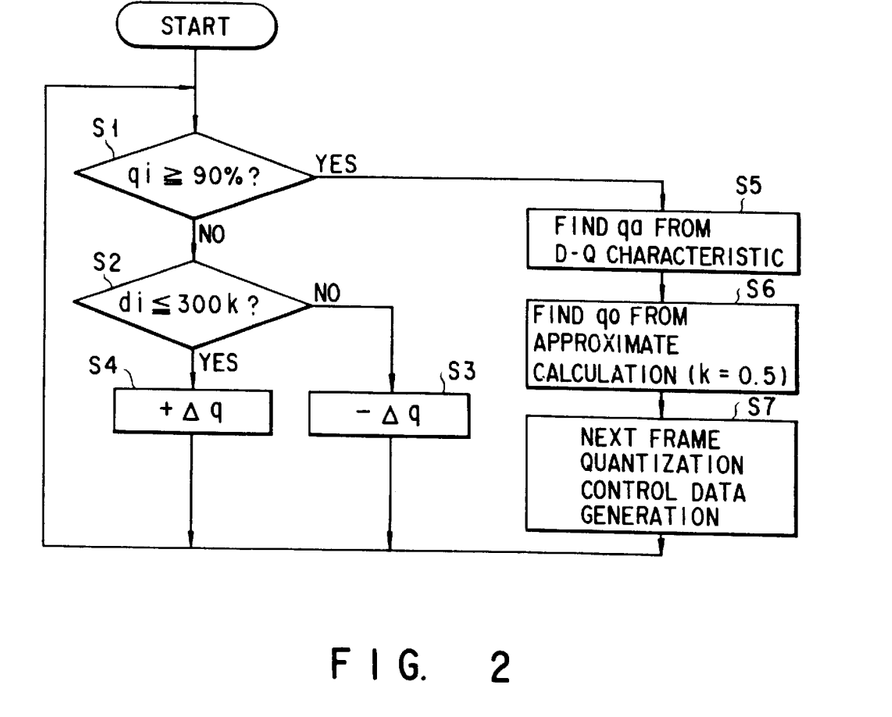
FIG. 2 is a flow chart showing a basic control algorithm of a quantization control section of the embodiment.
Figure 3:
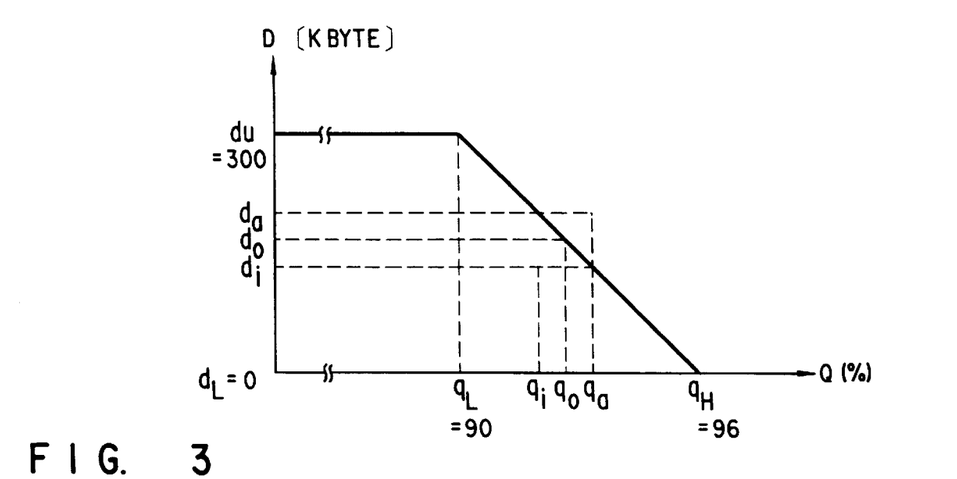
FIG. 3 is a characteristic diagram showing a given code quantity-quantization level control characteristic initially set to the quantization control section in the present embodiment.

FIG. 2 shows a control flow when the D–Q control characteristic as shown in FIG. 3 is set to the quantization control section 15.

At step S1, it is determined whether or not a current quantization level qi is greater than, or equal to, 90%. If it is less than 90%, that is, the answer is in the negative, it is determined whether or not, at step S2, a current code quantity di is equal to, or less than, 300 kilobytes. If it is equal to, or less than, 300 kilobytes, that is, the answer is in the affirmative, quantization control data for incrementing the quantization level by one step is generated at step S3. If, on the other hand, greater than 300 kilobytes or the answer is in the negative, quantization control data for decrementing the quantization level by one step is produced at step S4 and control goes back to step S1 and the next process is carried out.

At step S1, when the quantization level is greater than 90% or the answer is in the affirmative, reference is made to the D–Q control characteristic, finding a quantization level qa on the characteristic corresponding to the code quantity di at step S5. At step S6, an approximate computation of qo=k(qi+qa), where normally k=0.5, is carried out to determine a quantization level qo relative to the next frame. A corresponding quantization control data is generated at step S7 and control is returned back to step S1 for the next frame to be processed.

Figure 4:
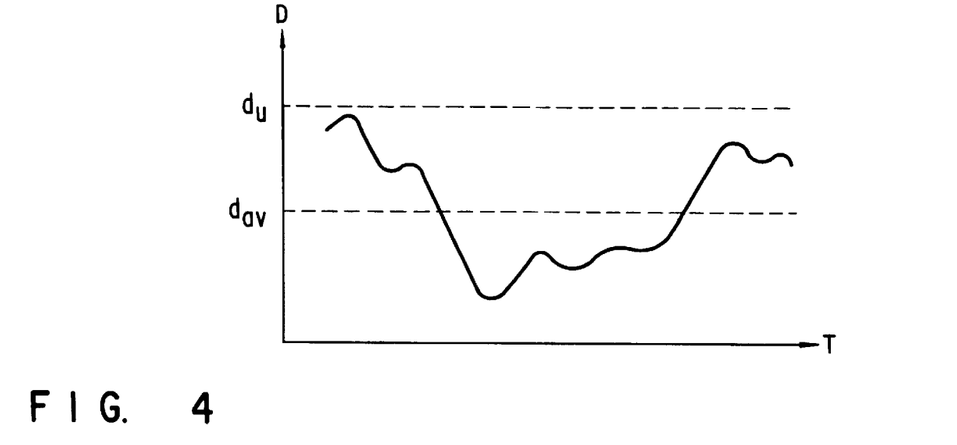
FIG. 4 is a waveform showing a code quantity variation under control of the quantization control section in the present embodiment.

In the case where quantization control is made on the aforementioned control flow, the code quantity D greatly varies, in a range of an allowable code quantity du as shown in FIG. 4, in accordance with the type of image (quantization level of above 90%, code quantity of below 300 kilobyte) and, upon being averaged over a longer period of time, approaches the average code quantity previously found.

Here, since the previously found average code quantity is an estimated value, there may be a possibility that it will not coincide with an average code quantity of an actually input video data. In such a case, it is possible to find an average code quantity on the input video data for the number of those past prescribed frames and correct the value k on the basis of the average code quantity.

Figure 5:
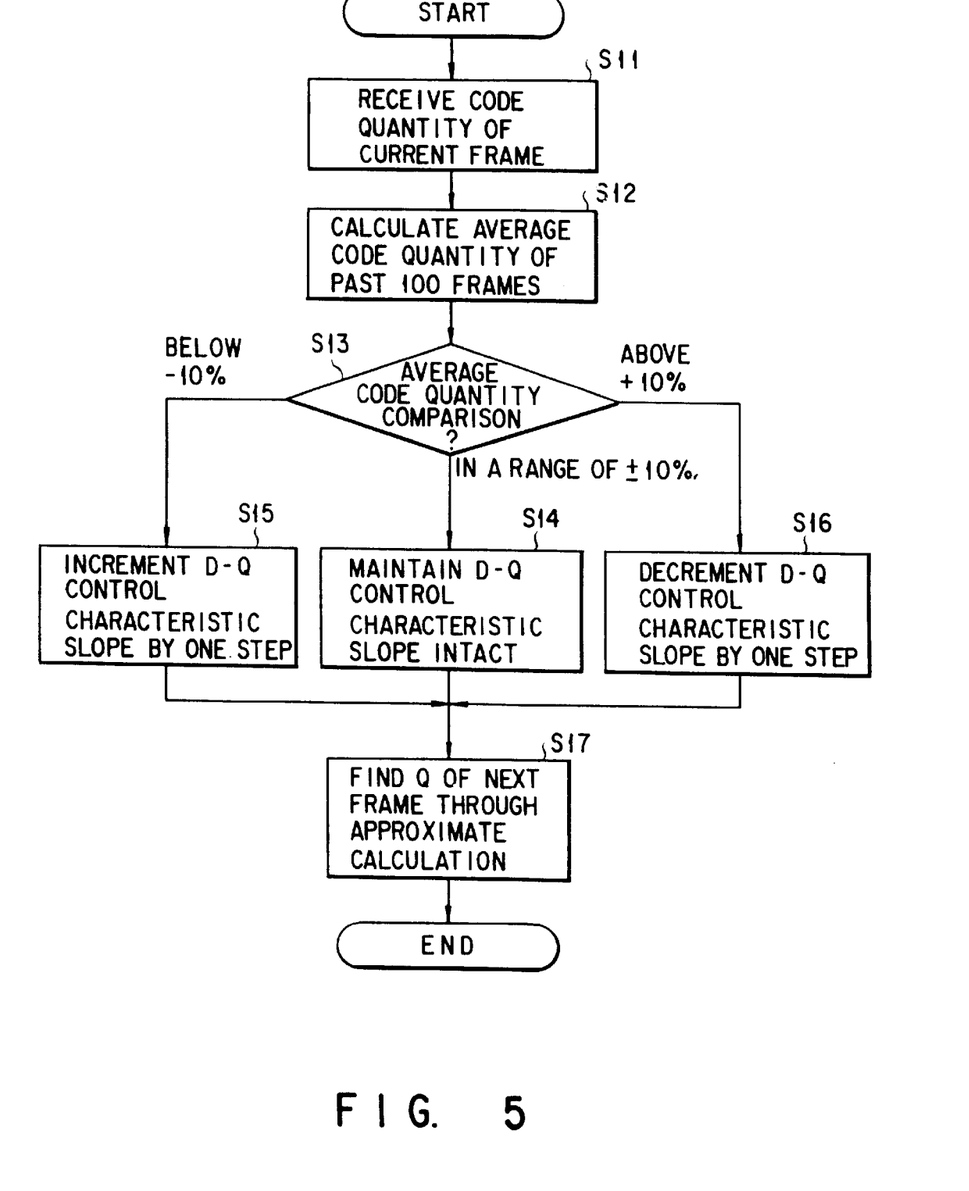
FIG. 5 is a flow chart showing a control flow for automatically controlling a code quantity-quantization level control characteristic of the quantization control section above.

Further, it is also possible to handle this case by adjusting the D–Q control characteristic per se from an actually measured average code quantity without varying the value of k. Automatic adjustment can also be made through feedback control. FIG. 5 shows a control flow and FIG. 6 shows the way the D–Q control characteristic varies through such control.

First, a code quantity for a current frame is received at step S11 and an average code quantity for those past 1000 frames, including a current frame's code quantity, is calculated at step S12. Step S13 makes a comparison with the average code quantity which is based on the current D–Q control character.

Figure 6:
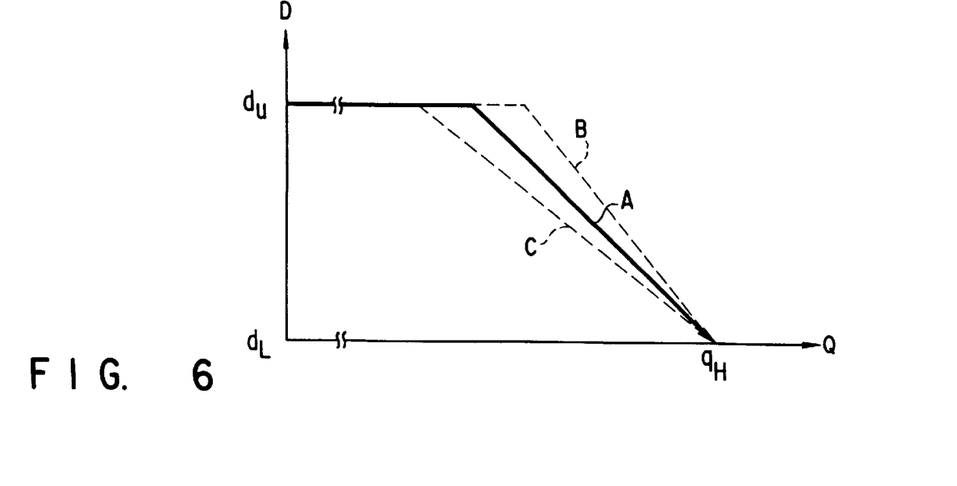
FIG. 6 is a characteristic diagram showing the manner in which the code quantity-quantization level control characteristic is adjusted by the control flow of FIG. 5.

Here, when a comparison difference is in a range of ±10%, the D–Q control characteristic is held intact as indicated by A in FIG. 6—step S14. When the comparison difference is below −10%, the slope of the D–Q control characteristic as indicated by B in FIG. 6 is incremented, by one step, at step S15. When, on the other hand, the comparison difference is above +10%, the slope of the D–Q control characteristic as indicated by C in FIG. 6 is decremented, by one step, at step S16.

Finally, on the basis of a newly found D–Q control characteristic a quantization level Q of the next frame is approximately calculated to find corresponding quantization control data at step S17. The data is sent to the quantizing section 12. By so doing it is possible to obtain an appropriate D–Q control characteristic at all times and hence to achieve more effective compression coding.

Although, in the aforementioned embodiment, the present invention is applied to a video recording/playback apparatus capable of taking a greater margin for a variation in a code quantity, it is not restricted thereto. For example, the present invention is also applicable to the case where a transmission rate is flexible as, for example, in an ATM transmission. Further, the coding is not only in a frame unit but also in any given block unit, such as a field unit.

Figure 7:
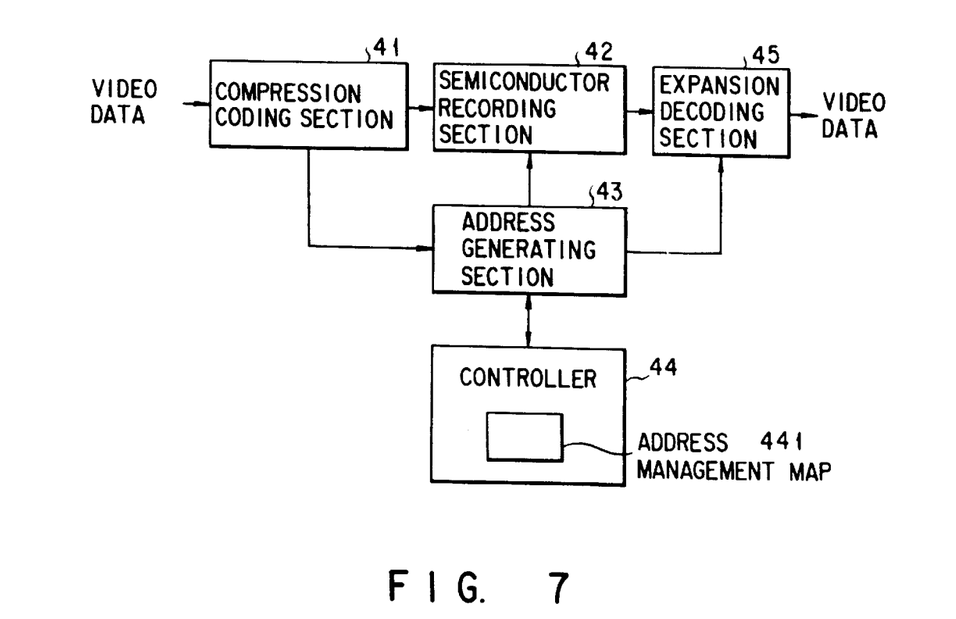
FIG. 7 is a block diagram showing a video compression recording/playback apparatus according to another embodiment of the present invention.

In FIG. 7, input video data is input to a compression coding section 41 and is compression coded in a field unit and sent to a semiconductor recording section 42 with a semiconductor memory serving as a memory medium. Here, the compression coding section 41 grasps a quantity of code generated in a field unit. Information corresponding to the code generation quantity is sent to an address generating section 43.

The address generating section 43 is controlled by a controller 44. The controller 44 is equipped with an address managing map 441 for storing start and end addresses involved when coded data is written in the semiconductor recording section 42. Based on this map information, a write start address designates a write start address 43 at a time synchronizing with the input video signal.

Upon receipt of the write start address designation from the controller 44 and code generation quantity information from the compression coding section 41, the address generating section 43 sets the start address and end address and the corresponding address data are sequentially generated and sent to the semiconductor recording section 42.

The controller 44 receives recorded video address information (start and end addresses) from the address generating section 43 and the corresponding field unit's address information, together with an input video material number, is stored in the map 441. Any given material is selected from the video materials stored in the semiconductor recording section 42 and, when reading is made from the given field, an instruction corresponding to the start address is supplied to the address generating section 43.

The address generating section 43 generates addresses in a sequence of designation starting from the start address, thus reading out those compression-coded data designated to the semiconductor recording section 42.

The read-out data are sent to an expansion-decoding section 45 where they are expansion-decoded into original video data.

Here, the compression coding section 41 and expansion decoding section 45 receive compression—and expansion—ratio control signals, respectively, which are generated by the controller 44, via the address generating section 43 so that the compression and expansion ratios can be properly set.

Figure 8:
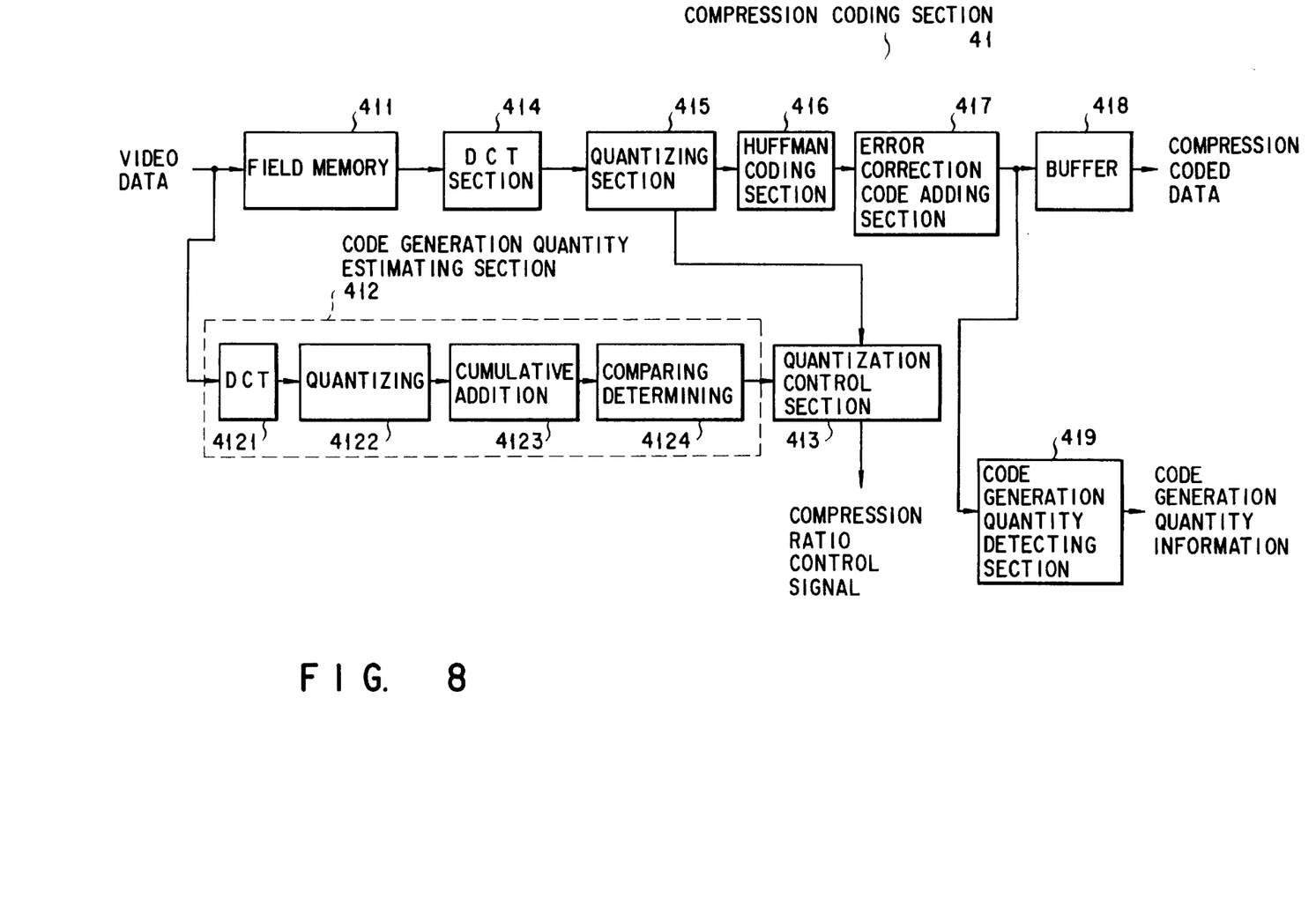
FIG. 8 is a block diagram showing a practical arrangement of a compression coding section in the embodiment.

FIG. 8 shows a practical form of the aforementioned compression coding section 41. In the compression coding section 41, input video data IN is one field-delayed, by a field memory 411, and sent to a DCT 414 where it is transformed to a 2-dimensional orthogonal signal. The signal is sent to a quantizing section 415. On the other hand, the input video data is also sent to a code generation quantity estimating section 412.

The aforementioned code generation quantity estimating section 412 is adapted to estimate a field unit's compression code quantity and comprises a DCT section 4121, quantizing section 4122, cumulatively adding section 4123 and comparing/determining section 4124.

That is, in the code generation quantity estimating section 412, the DCT section 4121 sequentially transforms one-field video data to 2-dimentional orthogonal data, the quantizing section 4122 subjects the data to a requantization process, the cumulatively adding section 4123 subjects those requantization values to a cumulative addition process. By so doing, it is possible to find a frequency distribution over one field time period of the input video signal.

Here it is known that, when the video data is converted into its frequency components, they have the property of being concentrated toward a low-pass region for a coarse type of image and becoming broader from the low-pass toward a high-pass region for a line type of image.

The aforementioned code generation quantity estimating section uses the property as set out above and its comparing/determining section compares a result of cumulative addition with a reference value and, when the result of cumulative addition is higher than the reference value, determines that there are high frequency components and there are more code generation quantity involved and, when the result of cumulative addition fail to reach the reference value, determines that there are low frequency components and there are less code generation quantity involved. The determining information is fed to a quantization control section 413.

Based on a compression ratio control signal fed by the controller 44 via the address generating section 43, the quantization control section 413 selects one quantization table set, for each compression ratio, relative to the quantizing section 415 on a main system path. At that time, the selection table is adjusted, for each field, based on the code quantity determination information obtained at the code generation quantity estimating section 412. This adjustment is effected in a timing in which an input digital video signal one-field delayed by the field memory 411 reaches the quantizing section 415.

The quantizing section 415 has, as set out above, a plurality of quantization tables each corresponding to the compression ratio and performs a requantization on a field-unit basis by performing compression computation process on a 2-dimensional orthogonal signal which is input with a quantization coefficient series of that table designated by a table select signal from the quantization control section 413.

The signal requantized by the quantizing section 415 is sent to a Huffman coding section 416 where it is again coded. The coded signal of the Huffman coding section is sent to an error correction code adding section 417 where an error correction code is added to the Huffman code. The compression-coded data generated in the field unit is sent to a semiconductor memory section 42 through a buffer 418.

Further, the compression-coded data is also fed to a code generation quantity detecting section 419 where, through the count process of the bit number, a code generation quantity is found. The code generation quantity information is sent to the address generation section 43.

Figure 9:
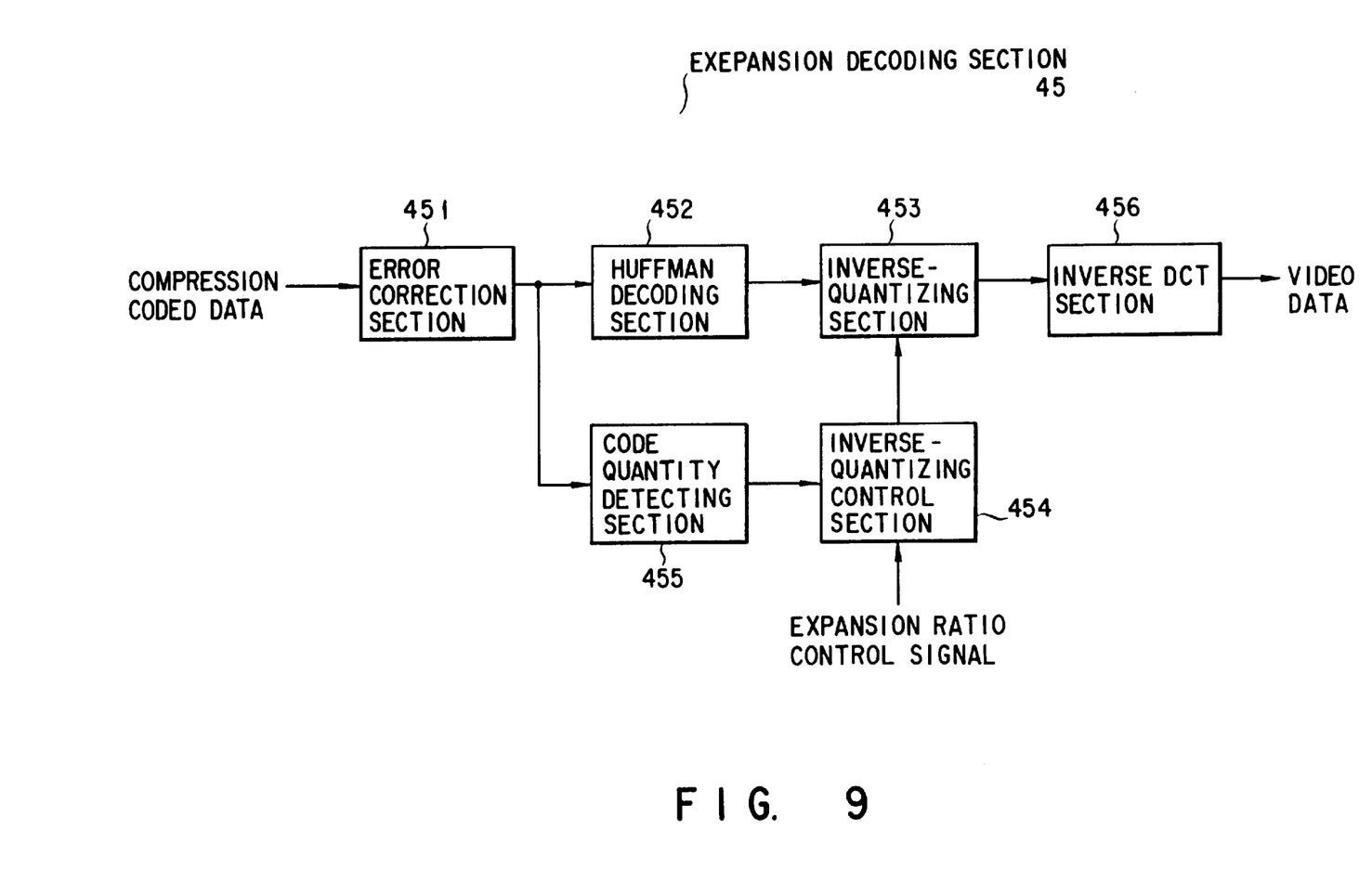
FIG. 9 is a block diagram showing a practical arrangement of an expansion coding section in the embodiment above.

FIG. 9 shows a practical arrangement of the aforementioned expansion decoding section 45 and its signal process is basically the opposite to that of the compression coding section 41.

The compression-coded data read from the semiconductor memory section 42 is error correction processed based on the error correction code added by an error correcting section 451 to the data involved. The error-corrected data is supplied to a Huffman decoding section 452 where it is decoded. The decoded data of the Huffman decoding section 452 is supplied to an inverse-quantizing section 453.

The inverse-quantizing section 453 allows a compression-quantized signal which is decoded on a field-unit basis to be expanded, through an inverse quantization, back into a 2-dimensional orthogonal signal and has a plurality of inverse quantization tables each corresponding to an expansion ratio.

An inverse quantization control section 454 for controlling the table selection of the inverse-quantizing section 453 is responsive to an expansion ratio control signal received under the controller 44 to supply a table select signal corresponding to the expansion ratio to the inverse-quantizing section 453 and to designate that table for use in inverse quantization.

Based on a code quantity detection value obtained by counting the compression-coded data by a code quantity detecting section 455 after the error correction has been achieved, the inverse-quantizing control section 454 adjusts a select table for each field so that, in the inverse-quantizing section 453, an inverse-quantizing table is selected in a corresponding relation to the quantizing table selected by the quantizing section 415 in the compression-coding section 41.

Upon receipt of a table designation, the inverse-quantizing section 453 performs expansion computation process on the compression-quantized signal from the Huffman decoding section 452 with the use of an inverse-quantizing coefficient series of the designated table. By so doing, it is possible to obtain an original 2-dimensional orthogonal signal of the field unit. The 2-dimensional orthogonal signal is sent to an inverse DCT section 456 where it is transformed back to original video data.

The operation of the aforementioned arrangement will be explained below with reference to FIGS. 10A to 10D and 11.

For ease in explanation, here, let it be assumed that the quantizing section 415 of the compression coding section 41 and inverse-quantizing section 453 of the expansion decoding section 45 have 30%, 50% and 70% quantization tables and inverse quantization tables, respectively; that a 50% compression ratio is set to the controller 44; and that the frequencies fr1 and fr2 (fr1<fr2) are set as first and second reference values to the comparing/determining section 4124 in the code generation quantity estimating section 412.

Figure 10A:
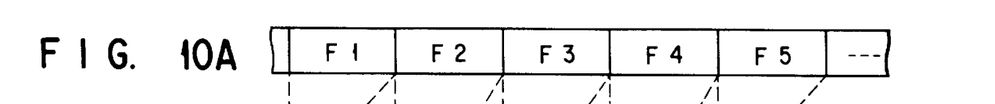

Given that video data as shown in FIG. 10A is input, it is sent to the field memory 411 and code generation quantity estimating section 412 in the compression-coding section 41. The code generation quantity estimating section 412 finds a per-field frequency distribution of the input video signal and, through comparison between fr1 and fr2, the code generation quantity is estimated at three steps.

Here let it be assumed that, in the video data of FIG. 10A, the code generation quantity is determined as being small in a range of less than fr1 over a frequency distribution of the fields F1 and F5, being moderate in a range of above fr1 but less than fr2 over a frequency distribution of the field F3 and being large in a range of above fr2 over a frequency distribution of the fields F2 and F4. The result of estimation is sent to the quantization control section 413.

Figure 11:
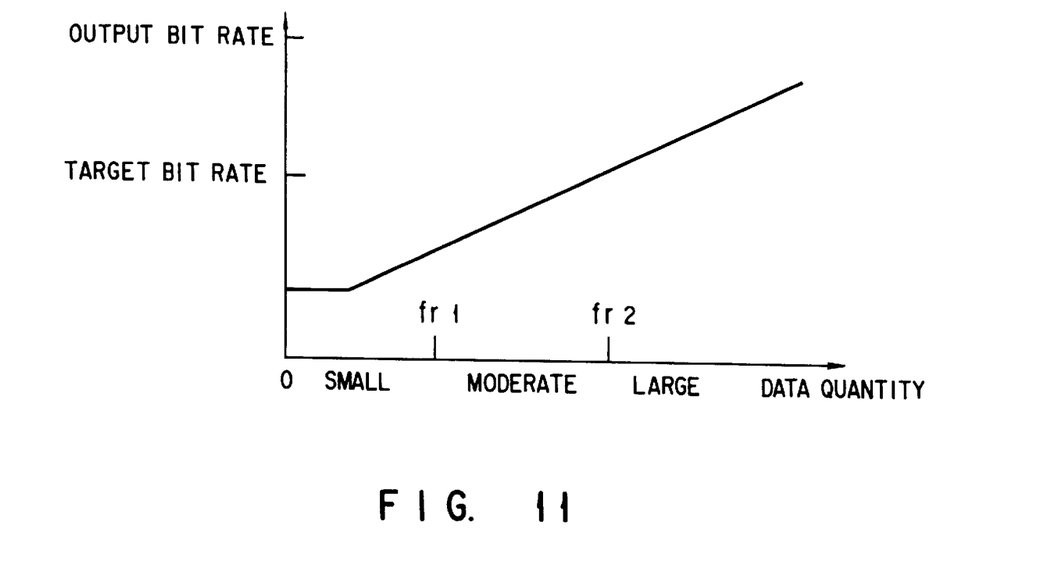
FIG. 11 is a characteristic diagram showing a relation, to a code generation quantity, of an actual output bit rate emergent by the compression coding with respect to a target bit rate.

When 50% is designated by a compression ratio control signal sent under the controller 44 via the address generation section 43, a quantization table of a 50% compression ratio is selected at the quantization control section 413 relative to the quantizing section 415. At this time, a quantization table of a 30% compression ratio is selected when a result of estimation by the code generation quantity estimating section 412 is determined as being small and a quantization table of a 70% compression ratio is selected when such a result of estimation is determined as being large. That is, the relation of an actual output bit rate by the compression coding to a target bit rate which is set to the controller 44 is as shown in FIG. 11.

On the other hand, the video data one field-delayed by the field memory 411 is sent to the DCT section 414 where it is transformed into a 2-dimensional orthogonal signal. This data is sent to the quantizing section 415. The quantizing section 415 subjects, to a compression computation process, the 2-dimensional orthogonal signal which is input with a quantization coefficient series of a designated table. In this way it is possible to perform a requantization on a field-unit basis.

The requantized signal which is obtained by the quantizing section 415 is recorded by the Huffman coding section 416 and, after being added, by the error correction code adding section 417, with an error correction code, is fed via the buffer 418 to the semiconductor memory section 42. At the same time, a code generation quantity is found by the code generation quantity detecting section 419 and sent to the address generating section 43.

Figure 10B:
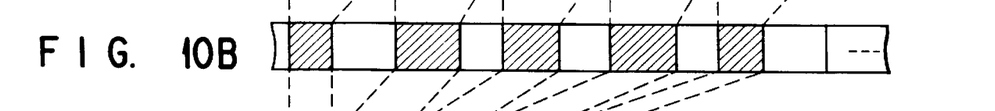

The compression state, at this time, of the compression-coded data series is as shown in FIG. 10B. That is, the data are compressed at their different ratios on the field-unit basis, namely, at a ratio of 30% for F1 and F5, 50% for F3 and 70% for F2 and F4.

Figure 10C:
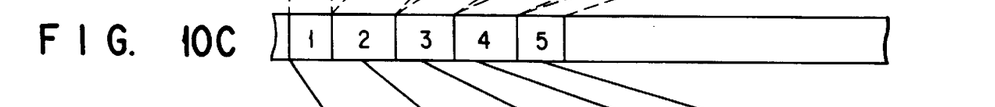

The controller 44, referring to the address management map 441, designates a start address S-ADR1, S-ADR2, . . . to the address generating section 43, for each corresponding field, in a timed relation to the input video data. The address generating section 43 finds those addresses from the designated start address to an end address found from per-field code generation quantity information from the compression coding section 41 and sends them to the semiconductor memory section 42. By so doing, the compression-coded data input to the semiconductor memory section 42, being different in code quantity for each field, are recorded, without any waste, in compact form as shown in FIG. 10C.

Figure 10D:
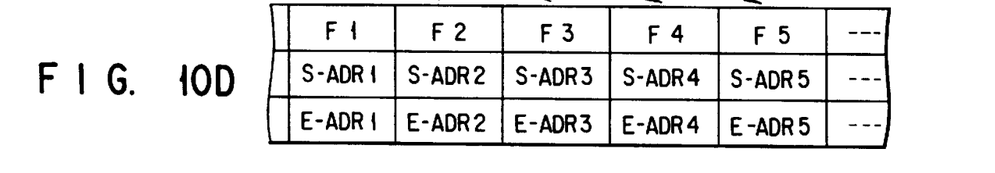

At this time, not only the video material number but also the start address S-ADR and end address E-ADR of those data recording areas in the respective fields as shown in FIG. 10D are written into the address management map 441 in the controller 44. By so doing, the controller 44 grasps any empty areas in the semiconductor memory section 42 and any data memory areas in the respective fields for a plurality of video materials and can read any given video material from any given field.

Upon playback of the video material, the corresponding video material number and field are designated to the controller 44. At that time, the controller 44 allows the designated video material number and start address corresponding to the field to be read from its address management map 441 and designates them to the address generating section 43. At the same time, an expansion ratio control signal corresponding to the expansion ratio of the recording material is sent to the expansion decoding section 45.

The address generating section 43 sequentially generates addresses starting from the designated start address and, by so doing, the compression-coded data of the designated video material are sequentially read from the semiconductor memory section 42 in the field sequence. The read-out data is expansion decoded by the expansion decoding section 45 to the corresponding field width and hence converted to the original video data.

That is, the redundant information quantity of the video data varies depending upon the type of image. In order to suppress the degradation of the image quality to a minimum, the best method is by variably controlling the compression ratio in any given range in accordance with the type of image. In this case, however, the recording information quantity varies per unit time and, in order to make recording on a recording medium, such as a magnetic tape, it is necessary to provide any means for achieving this at a fixed rate with the use of a buffer memory.

When reading is made from any given field or frame in the case where such a buffer memory is used, there occurs some indefinite delay corresponding to a few frames in addition to any extra time required for an ordinary program location, thus proving not fitted to a working environment, such as editing.

In the present time, some digital VTRs have been commercialized with a compression function incorporated therein. In these, recording is made at a fixed data rate in view of the problem above, but the data rate cannot be set adequately high in view of the necessity to suppress the degradation of an image quality resulting from the compression involved.

In view of these problems, the video compression recording/playback apparatus of the arrangement as set out above has solved the aforementioned problems by using, for example, a semiconductor memory as a recording medium. That is, it is possible to instantly read associated data from any corresponding address in the semiconductor memory which allows ready management of its memory areas as a recording medium and to manage the start address under the controller 44, even if the data quantity varies for each field or frame of the video, and to ensure an instant playback from any given field or frame.

Therefore, the video compression recording/playback apparatus can instantly effect a playback from any given field or frame without degrading an image quality on a video material recorded and contribute much to the working environment, such as the editing of a broadcast program.

Although, in the aforementioned embodiment, process has been explained as being performed on the field-unit basis, the same advantage can also be obtained in the case where processing is carried out on the frame-unit basis.

Figure 12:
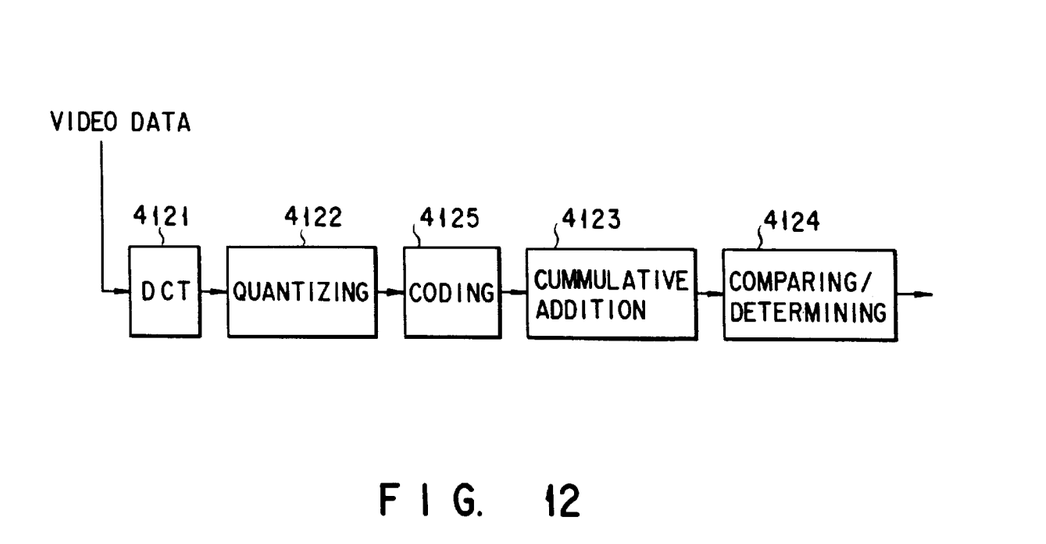
FIG. 12 is a block diagram showing a practical arrangement of another form of a code generation quantity estimating section in the present embodiment above.

In the code generation quantity estimating section, processing can also be performed as shown in FIG. 12 by further coding a requantized output of a quantizing section 4122 by a Huffman coding section 4125, cumulatively adding together the outputs of the Huffman coding section 4125 to directly find a code quantity and comparing it with a reference quantity and determining a code generation quantity through that size comparison.

Figure 13:
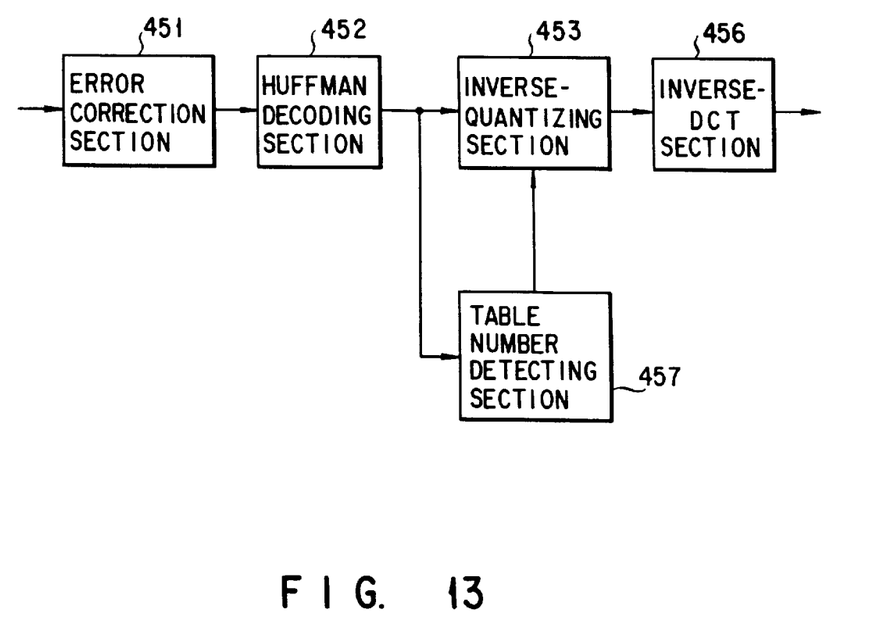
FIG. 13 is a block diagram showing another form of an expansion coding section of the embodiment above.

If, in the quantizing section 415 of the compression-coding section 41, selected table number information is added at the time of coding a compression-quantized signal, then at the side of the expansion-coding section 45 the table number information is read from the output of a Huffman decoding section 452 by means of a table number detecting section 457 and a table select designation is made to an inverse-quantizing section 453 as seen from FIG. 13. Simply by so doing, it is possible to convert the corresponding signal back into a corresponding 2-dimensional orthogonal signal. In this case it is possible to obtain a resultant simplified arrangement without the need for making an expansion ratio designation to the expansion decoding section 45 under control of the controller 44 and making code quantity detection at the expansion decoding section 45 upon playback.

As the recording medium use can be made of not only the semiconductor memory but also, for example, a magnetic disc, optical disc and magneto-optic disc which allow ready management of their memory areas and the relatively high-speed readout of data from any given area.

Additional advantages and modifications will readily occur to those skilled in the art. Therefore, the invention in its broader aspects is not limited to the specific details, and representative devices, shown and described herein.

Accordingly, various modifications may be made without departing from the spirit or scope of the general inventive concept as defined by the appended claims and their equivalents.

What is claimed is:

1. A video compression coding apparatus comprising:
a quantization section for quantizing unit video data, which is divided in units of a predetermined time interval and includes at least one of fields and frames, with a quantization level designated with quantization control data;
a variable length coding section for compression coding quantized data, which is output from the quantizing section, in units the divided unit video data;
a code quantity detecting section for detecting a code quantity of coded data output from the variable length coding section; and
a quantization control section, having an initially given code quantity-quantization level control characteristic showing a relation, to the quantization level, of the code quantity, for finding, from the control characteristic, a quantization level corresponding to the code quantity detected at the code quantity detecting section, generating quantization control data corresponding to the quantization level, supplying the data to the quantization section, and controlling the quantization level of whole video data next entered,
wherein the code quantity-quantization level control characteristic is one obtained by finding an average code quantity from code quantities at respective past frames or respective past fields and by finding a relation, to the quantization level, of the quantization quantity for setting the code quantities of the compression coded data output from the variable length coding section to correspond to the average code quantity, and
the quantization control section includes means for deciding whether or not a present quantization level is a quantization level at which an allowable image quantity is obtained, for finding, from the control characteristic in a case of the quantization level being below the allowable image quality, a quantization level at which a best image quality is obtained within an allowable range of the code quantity, for finding an average past code quantity each time the code quantity information is entered from the code quantity detecting section, for comparing the average code quantity with an average code quantity on which the present code quantity-quantization control characteristic is based, and adjusting the control characteristic in accordance with a result of comparison.

2. The video compression coding apparatus according to claim 1, wherein, given that, when a current block is compressed with a quantization level $q_i$, a code quantity after compression is represented by $d_i$, the quantization control section finds a corresponding quantization level $q_a$ from the code quantity-quantization level control characteristic, makes an approximate computation of $k(q_i + q_a)$ with the use of a constant $0<k<1$ and determines a result of computation as the quantization level of the subsequent video data.

3. The video compression coding apparatus according to claim 2, wherein the quantization control section has the function of properly correcting a value of k in a range of $0<k<1$.

4. A video compression recording/playback apparatus comprising:

a compression coding section for sequentially entering unit video data divided at each field or frame and setting a compression ratio variable in accordance with the unit video data;
a data recording/playback section for sequentially recording the compression coded data which is output from the compression coding section in an empty area in a memory medium and for playing back the compression coded data sequentially from any recording position of the recording medium; and
an expansion decoding section for sequentially expansion-decoding the compression coded data played-back by the data recording/playback section and setting an expansion ratio variable in accordance with a compression ratio of the played-back data;
a quantization section for quantizing unit video data divided at each field or frame with a quantization level designated with quantization control data;
a variable length coding section for compression coding quantized data, which is output from the quantization section, at each unit video data;
a code quantity detecting section for detecting a code quantity of coded data output from the variable length coding section;
a quantization control section, having an initially given code quantity-quantization level control characteristic showing a relation, to the quantization level, of the code quantity, for finding, from the control characteristic, a quantization level corresponding to the code quantity detected at the code quantity detecting section, generating quantization control data corresponding to the quantization level, supplying the data to the quantization section, and controlling the quantization level of whole video data next entered, wherein
the code quantity-quantization level control characteristic is obtained by finding an average code quantity from code quantities at respective past frames or respective past fields and by finding a relation, to the quantization level, of the quantization quantity for setting the code quantities of the compression coded data output from the variable length coding section to correspond to the average code quantity, and
the quantization control section includes means for deciding whether or not a present quantization level is a quantization level at which an allowable image quantity is obtained, for finding, from the control characteristic in a case of the quantization level being below the allowable image quality, a quantization level at which a best image quality is obtained within an allowable range of the code quantity, finding an average past code quantity each time the code quantity information is entered from the code quantity detecting section, for comparing the average code quantity with an average code quantity on which the present code quantity-quantization control characteristic is based, and for adjusting the control characteristic in accordance with a result of comparison.

5. The video compression recording/playback apparatus according to claim 4, wherein the data recording/playback section manages recorded and empty areas on the recording medium and manages the recorded areas for every unit dynamic video data.

6. The video compression recording/playback apparatus according to claim 4, wherein, when the recording medium is comprised of a semiconductor memory, the data recording/playback means comprises:

an address generating section for generating a recording/reading address to/from the semiconductor memory;

a map for managing the recorded area of the semiconductor memory with a corresponding address value; and a controller having a recording mode and a playback mode where, in the recording mode, the controller designates, by referring to the map, a start address value corresponding to a start empty area to the address generating section in a timed relation to the entry of the compression coded data and, in the playback mode, designates to the address generating section by referring to the map a start address value corresponding to a start memory area of the designated compression-coded data.

7. The video compression recording/playback apparatus according to claim 4, wherein the compression coding section adds compression ratio information to the compression-coded data and the expansion decoding section selects a corresponding expansion ratio from the compression ratio information added to the compression-coded data.

8. The video compression recording/playback apparatus according to claim 4, wherein, given that, when current video data is compressed with a quantization level qi, a code quantity after compression is represented by di, the quantization control section finds a corresponding quantization level qa from the code quantity-quantization level control characteristic, makes an approximate computation of k(qi+qa) with the use of a constant 0<k<1 and determines a result of computation as the quantization level of the next block.

9. The video compression recording/playback apparatus according to claim 4, wherein the quantization control section has the function of properly correcting a value of k in a range of 0<k<1.

* * * * *